United States Patent [19]

Beckman, Jr.

[11] 4,013,362
[45] Mar. 22, 1977

[54] ADJUSTABLE FORMS GUIDE
[75] Inventor: Maynard K. Beckman, Jr., Plano, Tex.
[73] Assignee: Xerox Corporation, Stamford, Conn.
[22] Filed: Sept. 25, 1975
[21] Appl. No.: 616,520
[52] U.S. Cl. .................................................. 355/75
[51] Int. Cl.² ......................................... G03B 27/62
[58] Field of Search .................. 355/75, 72, 122, 8

[56] References Cited
UNITED STATES PATENTS

| 3,188,652 | 6/1965 | Van Horne et al. | 355/72 |
| 3,436,149 | 4/1969 | Wicker | 355/75 |

FOREIGN PATENTS OR APPLICATIONS

| 1,147,484 | 4/1963 | Germany | 355/72 |
| 1,017,363 | 1/1966 | United Kingdom | 355/75 |

Primary Examiner—Donald A. Griffin
Attorney, Agent, or Firm—Sheldon F. Raizes

[57] ABSTRACT

An adjustable forms guide is provided on a xerographic computer printer platen for adjusting the position of a form on the platen to align or register the projection of the form through one optical system onto a photoconductor with data projected through another optical system onto the form at the photoconductor.

7 Claims, 3 Drawing Figures

ADJUSTABLE FORMS GUIDE

DESCRIPTION OF THE INVENTION

In some commercially available xerographic computer printers, such as the Xerox 1200, two independent optical systems are utilized for a final output image when forms are used. Variable data is exposed to a photoconductor drum by an optical character generator and a form is exposed to a photoconductive drum by placing the form on a platen and exposing the same to the photoconductor drum. The variable data projection must be matched in registration with the forms projection in order that the data be printed in the correct location on the form. Day-to-day tolerance drifts require that a mechanism be provided for placing a form on a platen in a manner to register the same with the data projection.

It is an object of this invention to provide a forms guide which may be attached to a copier platen and which is designed to readily adjust the position of a form on the platen to register the projection of the form through one optical system onto a photoconductor with data projected onto the form at the photoconductor through another optical system.

Other objects of the invention will become apparent from the following description with reference to the drawings wherein.

Figure 1:
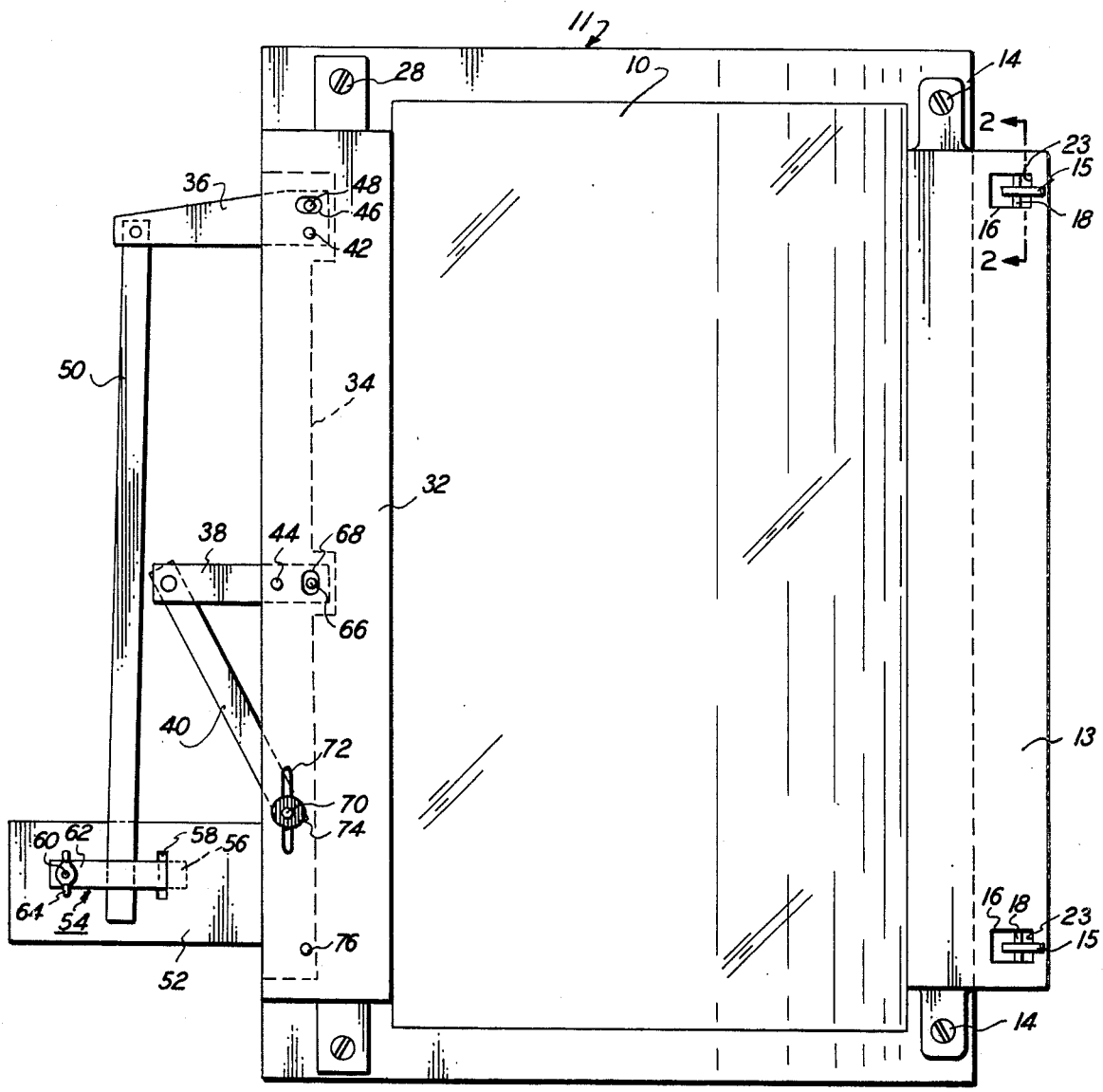
FIG. 1 is a plan view of a platen having an adjustable forms guide attached thereto.
Figure 2:
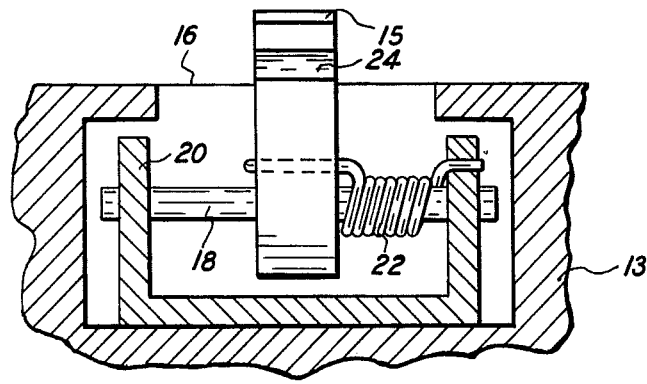
FIG. 2 is a view along section line 2—2 of FIG. 1.
Figure 3:
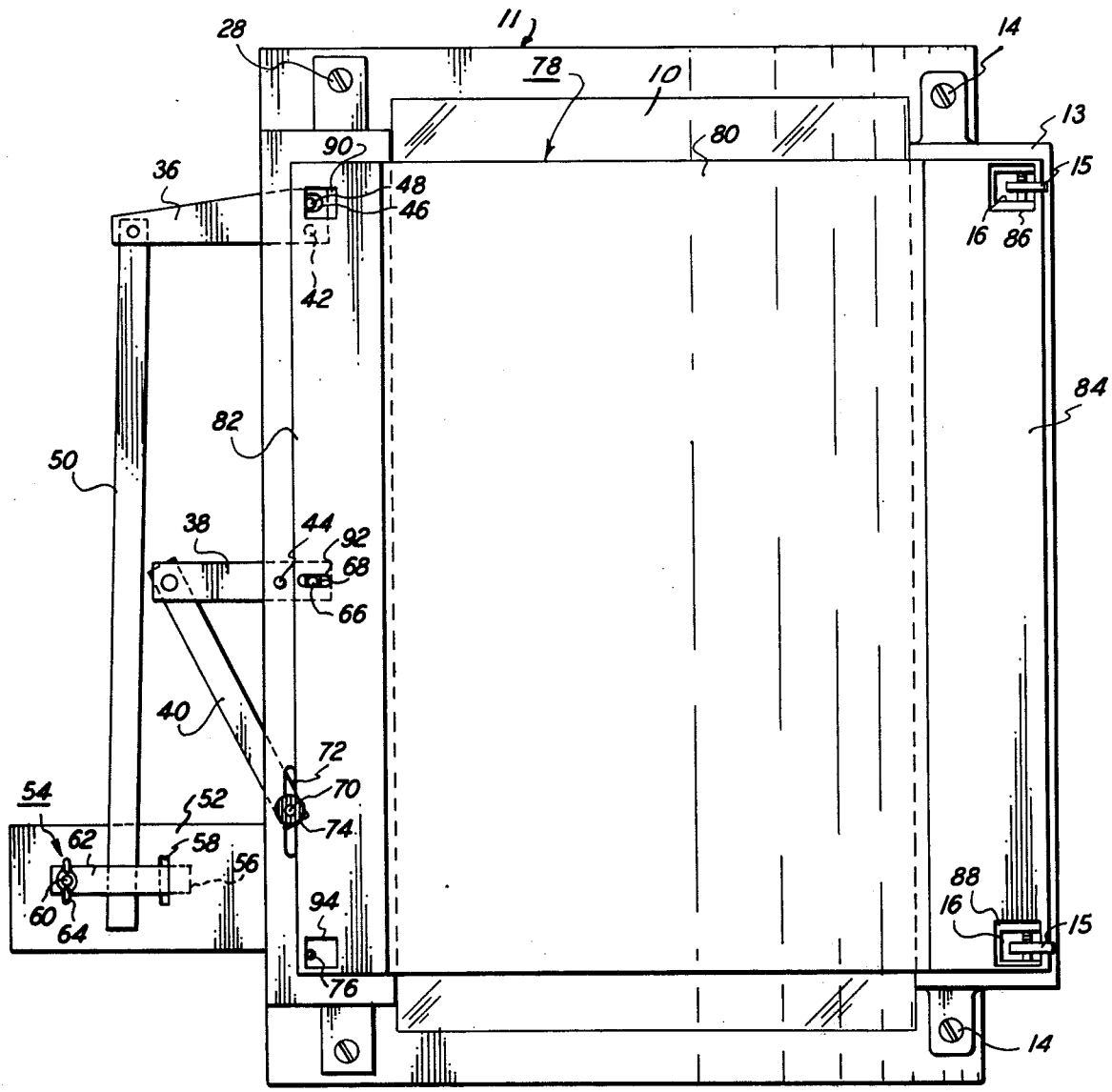
FIG. 3 is a view illustrating the form attached to the platen utilizing the forms guide.

Referring to FIG. 1, a curved glass platen 10 on a copying machine frame 11 is utilized for supporting a form 12 (FIG. 3). A support 13 is attached to the right edge of frame 11 by screws 14 and carries a pair of spring loaded vertically spaced apart pins 15 extending upwards through a slot 16. Referring more specifically to FIG. 2, each pin 15 has a shaft 18 extending therefrom which is rotatably received in the legs 20 of a U-shaped bracket secured to the support 13. A torsion spring 22 is coiled around a portion of the shaft 18 and has one end fixed to one of the legs 20 and the other end bearing against the pin 15 for urging the pin in a direction away from the glass platen 10 into engagement with edge 23 of the slot 16 which serves as a stop when the pins 15 are not being used to hold a form on the platen. Each pin 15 also has a tab receiving notch 24 therein.

Referring back to FIG. 1, attached to the other edge of the frame by screws 28 is an adjustable forms guide. The guide comprises a support base 32 having a recessed portion 34 for receiving therein portions of levers 36, 38 and guide link 40. Lever 36 is pivotally connected to the base 32 by a rivot 42 and lever 38 is pivotally connected to the base 32 by a rivot 44. A horizontally elongated slot 46 is provided on the base 32 and receives therethrough a pin 48 which extends upwards from the lever 36 to which it is secured. An actuating arm 50 is pivotally attached at one end to the lever 36 and slides between an extension 52 of edge and a hat shaped bracket 54. One flanged end 56 of the bracket 54 is inserted into a slot 58 on the support 52 to provide a hinged connection therebetween. A screw 60 extends upwards from the extension 52 through the end 62 of the bracket, and a wing nut 64 is threaded onto the screw 60 to clamp the bracket over the arm 50. The central portion of the bracket is substantially the same shape as the arm portion extending therebeneath and is so dimensioned to engage and secure the arm against movement when the wing nut is tightened.

A pin 66 is attached to and extends upwards from one end of the lever 38 through a vertically elongated slot 68 in the base 32. The guide link 40 is pivotally attached at one end to the lever 38 and has a threaded pin 70 attached thereto and extending upwards from the other end through a vertical elongated guide slot 72. A knob 74 is threaded on the pin 70 and overlaps the edges of the slot 72 to lock the link 40 in place when the knob 74 is tightened. The knob 74 is large enough to be manually grasped by a person. Manually shifting the knob 74 along the slot 72 will cause the link 40 to pivot lever 38 about rivot 20 thereby vertically shifting the pin 66. Manually shifting the arm 50 in the vertical direction will cause lever 36 to pivot about rivot 42 thereby horizontally shifting pin 48. Also, provided is a stationary pin 76 which is attached to and extends upwards from the base 32.

Referring to FIG. 3, a form sheet 78 comprises a flexible but strong central indicia bearing portion 80 and a pair of metal edges 82, 84 bonded to the central portion. The edge 84 contains a pair of vertically spaced openings 86, 88 which receive the spring loaded pins 15 therethrough. The right-hand edge of each opening 86, 88 hooks into the notch 24 of its respective pin 15 to prevent the edges of the opening from riding up the pins and becoming dislodged therefrom. The openings 86, 88 are larger in the vertical dimension than the pins 15 to allow for relative vertical movement therebetween. The edge 82 has an enlarged opening 90 for receiving the pin 48 therethrough, a horizontally elongated slot 92 for receiving the pin 66 therethrough and an enlarged opening 94 for receiving the pin 76 therethrough. The opening 90 is larger than its respective pin 48 in the vertical direction to allow relative vertical shifting therebetween. Slot 92 is larger than the pin 66 in the horizontal direction to allow relative horizontal shifting therebetween. Slot 92 is substantially the same dimension as the pin 66 in the vertical direction so any vertical shifting of the pin 66 will result in vertical shifting of the form 78. The opening 94 is larger than the pin 76 in the vertical direction to permit relative vertical shifting therebetween. The width of the form is less than the horizontal distance between the rest position of the pins 15 abutting the stop 23 and the pins 48, 66 and 76.

In operation, the form 78 is located on the adjustable forms guide by placing the openings 86, 88 over the spring biased pins 15 until the edges thereof slip into the notches 24 of the pins 15. The form is pulled horizontally thereby pivoting the pins 15 against the biasing force of the spring 22 acting thereon until the openings 90, 92 and 94 can be placed over their respective pins. The left-hand edges of openings 90 and 94 are urged and maintained in engagement with their resective pins 48 and 76 by the biasing force applied to the right-hand edges of openings 86 and 88 by the spring biased pins 15.

The frictional force between the edge of openings 86, 88 and the notches 24 and the edge of openings 90 and 94 and their respective pins 48 and 76, when the form is placed over all the pins, is such that the edges can still slide vertically relative to the pin 15. A combined form and data projection test copy is run. If the form is misaligned vertically, the operator loosens knob 74 and slides the same vertically in the appropriate direction along slot 72 causing lever 38 to pivot and shift pin 66 in the vertical direction thereby causing the form to shift vertically. If the form is skewed, the operator loosens wing nut 64 and slides arm 50 in the appropriate direction to rotate lever 36 and cause pin 48 to shift in the horizontal direction. If the lever 36 is rotated in a counterclockwise direction, the pin 48 will force the form to the left against the force of the spring biased pins 15 while, if the lever 36 is rotated in a clockwise direction, the pin 48 will allow the spring biased pins 15 to shift the form to the right.

Several test copies may have to be run and several manipulations of the knob 74 and arm 50 may be necessary before alignment is achieved. When alignment is achieved, the knob 74 and the wing nut 64 are tightened to lock the lever 40 and arm 50 against movement While the platen 10 is disclosed as being curved, it should be understood that the forms guide may also be adaptable to a flat platen.

What is claimed is:

1. An adjustable guide for aligning a form on a platen comprising: a platen; support means extending along one side of said platen; first and second levers pivotally connected to said support about an axis generally transverse to said platen; said levers being spaced from each other in the direction in which said one side extends; a projection on each of said levers extending upwards in a direction generally transverse to said platen; a stationary projection extending from said support means in a direction generally transverse to said platen; said stationary projection being spaced from the other said projections in the direction in which said one side extends; the projection on said first lever and the pivotal axis of said first lever being arranged that when said first lever is pivoted, its projection will translate in a direction which is generally in the same direction in which said one side extends; the projection on said second lever and the pivotal axis of said second lever being arranged that when said second lever is pivoted, its projection will translate in a direction generally transverse to the direction the projection on said first lever translates; and means, located on the side of said platen opposite said one side, being biased away from said platen in the same general direction as said second lever projection translates.

2. The structure as recited in claim 1 wherein said first lever is located between said second lever and said stationary projection.

3. The structure as recited in claim 1 further comprising means for selectively securing said levers against pivoting.

4. The structure as recited in claim 1 wherein said means being biased away from said platen comprises at least one member extending upwards in a general direction transverse to the platen and being pivoted about an axis which extends in the same general direction as said one side.

5. The structure as recited in claim 1 further comprising a form; said form including one side having a first opening receiving said first lever projection therethrough, a second opening receiving said second lever projection therethrough, and a third opening receiving said stationary projection therethrough; said means biased away from said platen operatively engaging the side of said form opposite said one side thereof and urging the edges of said second and third openings into engagement with their respective projections; said second and third openings being a greater dimension than their respective projections in the direction said first lever projection translates to allow shifting of said form in such direction relative to said second and third projections; said first opening being of a greater dimension than its respective projection in the direction said second lever projection translates to allow shifting of said form in such direction relative to said first lever projection; said first opening being substantially the same dimension as its respective projection in the direction said first lever projection translates; whereby pivoting of said first lever will cause shifting of said form relative to said platen in the same general direction in which said first lever projection translates and pivoting of said second lever will cause shifting of said form relative to said platen in the same general direction in which said second lever projection translates.

6. The structure as recited in claim 5 wherein said first lever is located between said second lever and said stationary projection.

7. The structure as recited in claim 5 wherein said means being biased away from said platen comprises at least one member extending upwards in a general direction transverse to the platen and being pivoted about an axis which extends in the same general direction as said one side, a fourth opening in said opposite side of said form receiving said pivotable member therethrough, said operable engagement between said form and said biased means being the engagement of said pivotable member with an edge of said fourth opening.

* * * * *